US009147240B2

(12) United States Patent
Maricic et al.

(10) Patent No.: US 9,147,240 B2
(45) Date of Patent: Sep. 29, 2015

(54) METHOD AND SYSTEM FOR CONTROLLING COLOR CHARACTERISTICS OF ONE OR MORE ILLUMINATION DEVICES

(71) Applicant: General Electric Company, Schenectady, NY (US)

(72) Inventors: Danijel Maricic, Niskayuna, NY (US); Ramanujam Ramabhadran, Niskayuna, NY (US); Mohamed Cherif Ghanem, Montreal (CA)

(73) Assignee: General Electric Company, Niskayuna, NY (US)

( * ) Notice: Subject to any disclaimer, the term of this patent is extended or adjusted under 35 U.S.C. 154(b) by 137 days.

(21) Appl. No.: 14/087,609

(22) Filed: Nov. 22, 2013

(65) Prior Publication Data
US 2015/0146931 A1 May 28, 2015

(51) Int. Cl.
G06K 9/00 (2006.01)
G06T 7/00 (2006.01)
G06T 7/40 (2006.01)
G06T 7/60 (2006.01)

(52) U.S. Cl.
CPC .............. *G06T 7/0004* (2013.01); *G06T 7/004* (2013.01); *G06T 7/408* (2013.01); *G06T 7/60* (2013.01)

(58) Field of Classification Search
None
See application file for complete search history.

(56) References Cited

U.S. PATENT DOCUMENTS 6,266,066 B1 * 7/2001 Koizumi ...................... 345/426
7,744,232 B2 6/2010 Gruenbacher et al.
8,890,952 B2 * 11/2014 Katz ............................. 348/135
2010/0213876 A1 8/2010 Adamson et al.
2011/0109445 A1 * 5/2011 Weaver et al. ........... 340/286.01
2011/0148737 A1 6/2011 Kang
2011/0266345 A1 11/2011 Fowler et al.
2012/0105210 A1 5/2012 Smith et al.
2012/0154627 A1 * 6/2012 Rivard et al. ............... 348/224.1

FOREIGN PATENT DOCUMENTS

| CN | 202019477 U | 10/2011 |
| JP | 2008017624 A | 1/2008 |
| KR | 20110092164 A | 8/2011 |
| WO | 2011002280 A1 | 1/2011 |

OTHER PUBLICATIONS

"RGB LED Strip Light Controller with RF Card Remote", LED centre, Downloaded from the Internet :< http://www.ledcentre.uk.com/272-led-light-accessories/351-rgb-led-strip-light-control>on Nov. 13, 2013, 2 Pages.

* cited by examiner

*Primary Examiner* — Shefali Goradia
(74) *Attorney, Agent, or Firm* — Mary Louise Stanford

(57) ABSTRACT

A method for operating illumination sources includes receiving a first set of images of one or more illumination sources that are generated by an image capturing device. The method further includes computing a first distance and a first perspective angle between the image capturing device and each illumination source during the generation of the first set of images. Furthermore, the method includes generating first characteristic information for each illumination source based on a comparison between at least one of the first distance or the first perspective angle for each illumination source with at least one of a predefined distance or a predefined perspective angle for each illumination source. The method also includes generating a command signal based on a comparison between the first characteristic information and a predefined characteristic threshold for each of the one or more illumination sources.

20 Claims, 3 Drawing Sheets

METHOD AND SYSTEM FOR CONTROLLING COLOR CHARACTERISTICS OF ONE OR MORE ILLUMINATION DEVICES

BACKGROUND

The present invention relates generally to illumination devices, and more particularly, to a method and system for controlling operation of illumination devices.

Incandescent and fluorescent lights have been used as light sources in commercial and domestic applications. However, with significant investment by manufacturers and an increased demand from consumers to develop efficient lighting systems, light emitting diodes (LEDs) have become an attractive as well as an economic option.

LEDs are being used as single light sources as well as a part of an array of light sources. Arrays of LEDs are utilized to generate light over the visible spectrum. Light from different LEDs in the array are mixed to generate a desired color from the array of LEDs. For example, in an LED panel, multiple LEDs emitting red light, green light, as well as blue light may be present. The LED panel is coupled with control electronics such that appropriate colored LEDs are activated to produce desired colors. Further, the intensity of light emitted by the red LEDs, blue LEDs, and green LEDs may also be controlled to generate desired colors. Such control requires accurate determination of light emitted by each LED in the LED panel. Further, due to continued usage of an installed LED panel, it is possible that some LEDs from the panel do not emit light of the desired intensity and/or wavelength and thus lead to a deviation in the desired color output of the LED panel.

Control systems are employed with current lighting systems to adjust the intensity of light emitted by the LEDs. Control systems are also configured to determine the color emitted by the LEDs and adjust the colors when any or all of the LEDs emit colors that are different from their prescribed colors. Determination of color emitted by a light source involves determining the coordinates of the color in a color space. Examples of color space include, but are not limited to, International Commission on Illumination (CIE) 1931, and CIE 1976. Further, color determination may also include determination of a Correlated Color Temperature (CCT) of the light source. The CCT value of a light source is an indicator of apparent "warmth" or "coolness" of the light emitted by the light source. CCT is typically expressed as a single number with Kelvin (K) as the unit of measurement. For commercially available light sources, manufacturers typically specify the color points as well as the CCT value for the light source.

Control systems are designed to maintain the emitted light within the prescribed range for CCT as well the color points. Manufacturers may provide a typical aging curve for lighting systems to indicate the change in both intensity and color point of the light source with an increase in operational time. However, in case of LED light sources, the aging curve may not be accurate since existing LED aging patterns have not been widely accepted.

Current systems and methods involve determination of color point and CCT values for a light source based on images of the light source and image processing techniques. However, these systems require imaging systems that are highly accurate. Also the image processing techniques, utilized to process high resolution images of the imaging systems, require high speed processing capabilities. These requirements add to the cost of controlling operations of lighting systems. Systems that are economical in terms of selection of components tend to compromise of accuracy of characteristic estimation. Accuracy in characteristic estimation is paramount to the determination of colors and the actions that need to be initiated to keep the light emitted by the light source in the prescribed color range.

Hence, there is a need for a system and a method that effectively determines color characteristics of illumination sources.

BRIEF DESCRIPTION

In one embodiment, a method for operating illumination sources is provided. The method includes receiving a first set of images of one or more illumination sources. The first set of images is generated by an image capturing device. The method further includes computing a first distance and a first perspective angle between the image capturing device and each illumination source during the generation of the first set of images. Furthermore, the method includes generating first characteristic information for each illumination source based on a comparison between at least one of the first distance or the first perspective angle for each illumination source with at least one of a predefined distance or a predefined perspective angle for each illumination source. The method also includes generating a command signal based on a comparison between the first characteristic information and a predefined characteristic threshold for each of the one or more illumination sources.

In another embodiment, a system is provided. The system includes a receiving unit programmed to receive a first set of images of one or more of illumination sources generated by an image capturing device. The system further includes an image processing unit programmed to determine coordinates of each of the one or more illumination sources in the received images. The system also includes a mapping unit programmed to map the coordinates of each of the illumination sources with a respective identification parameter of the illumination sources. Furthermore, the system includes a data repository programmed to store prior characteristic information of each of the one or more illumination sources. The prior characteristic information stored in the data repository includes characteristic information determined based on images of the illumination sources captured by the image capturing device from a plurality of prior perspective angles and distances. The system includes a control unit that is programmed to identify from the prior characteristic information at least one of a predefined distance and a predefined perspective angle. The control unit identifies the prior distance and the prior perspective angle as the predefined distance or the predefined perspective angle when the prior characteristic information is equal to a predefined characteristic threshold for each of the illumination sources. The control unit is further programmed to compute a first distance and a first perspective angle between the image capturing device and each of the one or more illumination sources during the generation of the first set of images. The control unit also generates first characteristic information for each illumination source based on a comparison between at least one of the first distance and the first perspective angle for each illumination source with at least one of the predefined distance and the predefined perspective angle.

DRAWINGS

Other features and advantages of the present disclosure will be apparent from the following more detailed description of the preferred embodiment, taken in conjunction with the accompanying drawings which illustrate, by way of example, the principles of certain aspects of the disclosure.

DETAILED DESCRIPTION

Figure 1:
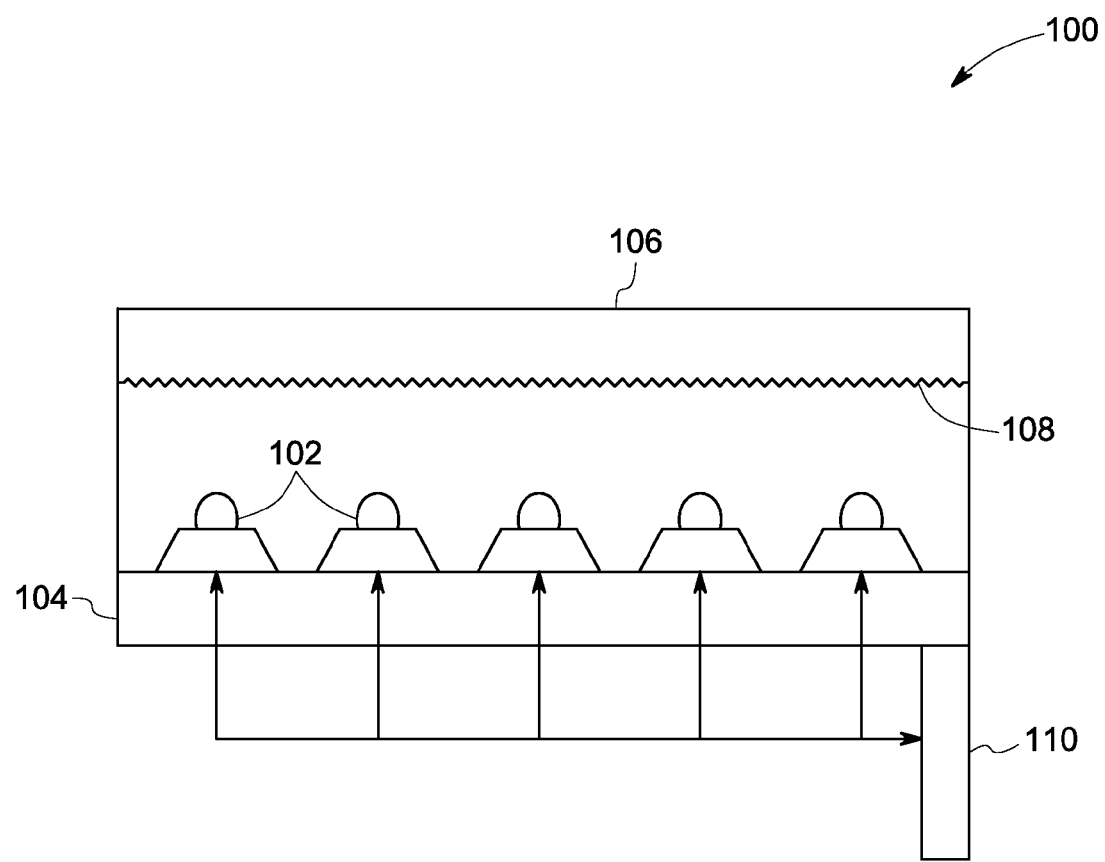
FIG. 1 illustrates a typical illumination system with a plurality of illumination sources.

Reference will be made below in detail to exemplary embodiments of the invention, examples of which are illustrated in the accompanying drawings. Wherever possible, the same reference numerals used throughout the drawings refer to the same or like parts.

Illumination sources are configured to emit light of prescribed colors. In large scale illumination systems, a plurality of illumination sources are employed and placed before a light mixing component, such as diffuser, to produce light of a specific color. Control systems need to be employed to evaluate the performance of the illumination sources and take corrective actions when the performance deviates from the prescribed standards. A system and method for determination of color characteristics of illumination sources is described in the foregoing paragraphs.

The system for determination of color characteristics includes an image capturing device. The image capturing device is configured to capture images of the illumination sources. The images of the illumination sources are processed by an image processing unit. The image processing unit is configured to determine pixel coordinates of the illumination sources in the images captured by the capturing device. The pixel coordinates are indicators of the location of the illumination sources in the set of images. Further, the system also includes a mapping unit that is configured to map the pixel coordinates with identification parameters of the illumination sources. The identification parameters for the illumination sources are utilized to send control signals to appropriate illumination sources. The system for determination of color characteristics further includes a data repository. The data repository is configured to store a plurality of past images of the illumination sources taken by the image capturing device from different distances and perspective angles. Further, the data repository is also configured to store color characteristics information for each of the past images captured by the image capturing devices. The processed images from the image processing unit are communicated to a control unit. The control unit is utilized to determine a predefined distance and a predefined perspective angle from the past characteristic information stored in the data repository. The control unit is further programmed to compare the distance from which the received set of images was captured with the predefined distance. Based on the comparison, the control unit is configured to determine the color characteristics information for each illumination source. The color characteristics information is compared with predefined color characteristics information for each illumination source. Corrective actions are taken by the control unit to adjust the present color characteristics information with the predefined color characteristics information. The corrective actions, which include a change in power supplied to the illumination sources, are communicated to each illumination source with the aid of the identification parameters associated with each illumination source. The image capturing device is utilized to capture images of the illumination sources after corrective actions have been taken to determine if more corrective actions are required.

FIG. 1 illustrates an illumination system 100 that includes illumination sources 102. Examples of illumination sources 102 include, but are not limited to, light emitting diodes (LEDs), incandescent light bulbs, fluorescent lamps, and the like. The illumination system 100 may include one or more illumination sources 102 that are placed on a panel 104. In the illustrated embodiment, the illumination system 100 includes a plurality of illumination sources 102. The plurality of illumination sources 102 can be evenly spaced. In certain embodiments, the plurality of illumination sources 102 may be arranged randomly over one surface of the panel 104. Further, the panel 104 that includes the illumination sources 102 may be sealed with an emission panel 106. The emission panel 106 may include a diffuser 108. The diffuser 108 may be configured to mix the light from the plurality of illumination sources 102 to minimize bright spots and make the spatial distribution of emitted mixed light more consistent outside the illumination system 100. The panel 104 that holds the illumination sources 102 may also be coated with diffusing material to produce desired colors from the illumination system 100. In certain embodiments, surfaces of the panels 104 and 106 may also be coated with phosphor material to convert wavelength of light emitted from few of the plurality of illumination sources 102 to a desired output wavelength. The panel 104 may be coated with a material to reflect and/or diffuse the light emitted from few or all the illumination sources 102.

The illumination system 100 further includes electronic circuitry 110 that is electrically coupled with the plurality of illumination sources 102. The electronic circuitry 110 is configured to provide activation signals to the plurality of illumination sources 102. The electronic circuitry 110 may include conversion circuitry to convert energy received in one form to energy of a second form that is desirable for the illumination sources 102. For example, the circuitry 110 may include an alternating current (AC) to direct current (DC) converter to convert AC power received from a power source to DC power that is supplied to the plurality of illumination sources 102. The circuitry 110 also includes communication circuitry to enable communication between the illumination system 100 and a central control unit. Although in the illustrated embodiment a single electronic circuitry 110 is coupled with each illumination source 102, in certain embodiments each illumination source 102 may be coupled with a separate electronic circuitry 110. The electronic circuitry 110 is coupled to the illumination sources 102 through the panel 104. For example, the panel 104 may be shaped like a container with hollow walls and illumination sources 102 may be placed on one such wall. The electronic circuitry 110 and the illumination sources 102 may be coupled through wiring that is installed in the hollow section of the walls of the panel 104.

Different configurations of diffusers, reflectors, and the illumination sources 102 are possible. For example, the illumination sources 102 and the diffusers may be placed at an angle with respect to each other such that the illumination system 100 emits light of desired color.

Figure 2:
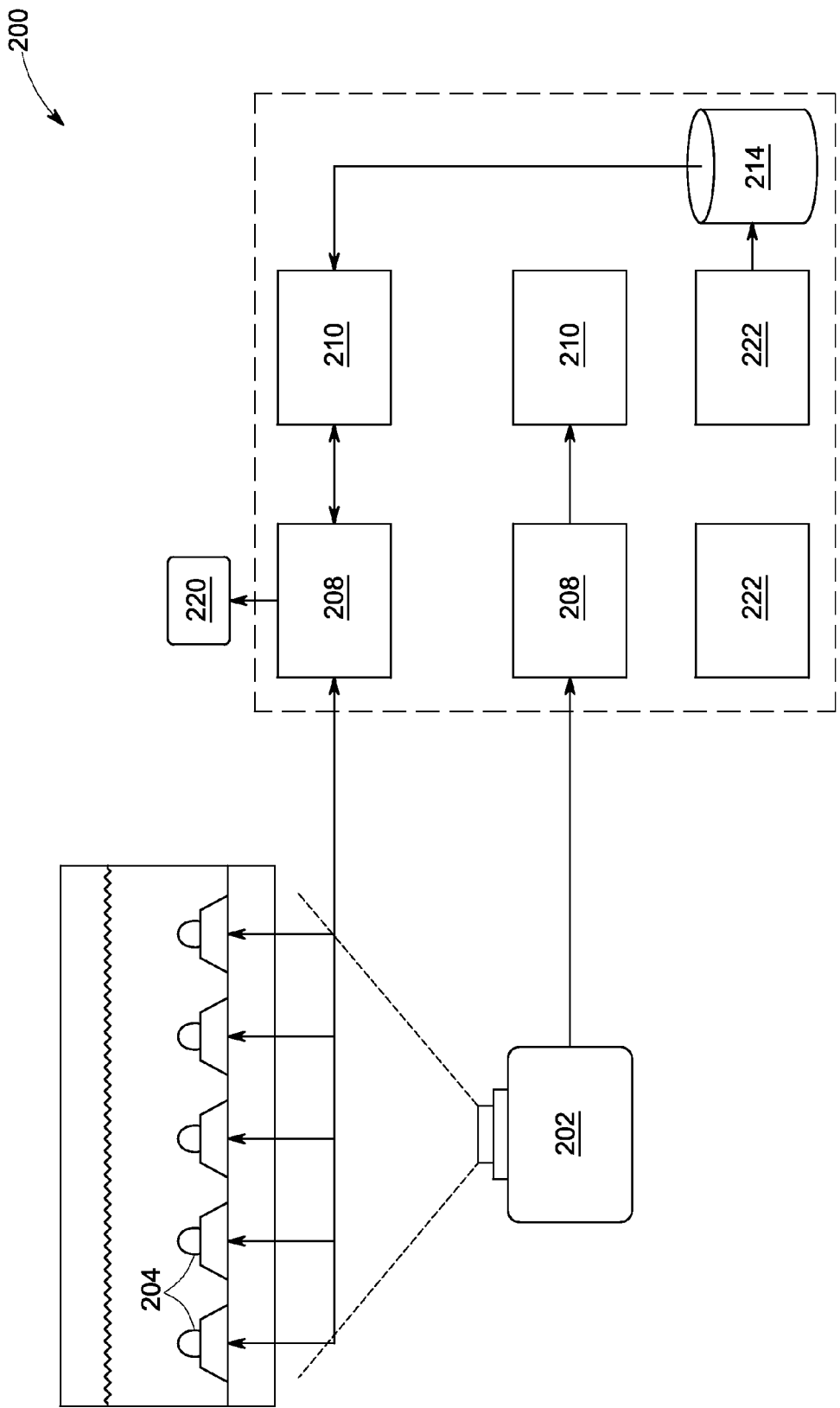
FIG. 2 illustrates a system for determination of color characteristics of the plurality of illumination sources.

FIG. 2 illustrates a setup 200 for determination of color characteristics of the illumination system 100. The setup 200 includes an image capturing device 202 that is configured to generate a plurality of images of the illumination system 100. Examples of image capturing device 202 include, but are not limited to, a camera, multi-spectral image capturing mechanisms, and the like. The image capturing device 202 may be disposed in a handheld computing device of an operator. For example, the image capturing device 202 may be a camera of a mobile phone with the operator. In other embodiments, the image capturing device 202 may be a standalone component that can either be handheld or permanently mounted in a testing area.

The setup further includes an illumination system 100. In certain embodiments, the illumination system 100 may be installed in a facility such as a room, or a hallway, or a workshop in a manufacturing facility. In other embodiments, the illumination system 100 may be temporarily detached from its original position and installed in a testing area. The illumination system 100, according to one embodiment, may include a plurality of illumination sources 204. In other embodiments, the illumination system 100 may include a single illumination source. The image capturing device 202 is configured to generate a first set of images of the illumination sources 204. The first set of images captured from different distances between the image capturing device 202 and the illumination sources 204. Further, the first set of images can also be captured from different perspective angles of the image capturing device 202 with respect to the illumination source 204.

The setup 200 further includes the system 206 for processing and determining color characteristics for the plurality of illumination sources 204. The system 206 includes a receiving unit 208. The receiving unit 208 is configured to receive the first set of images from the image capturing device 202. The first set of images from the image capturing device 202 may be transmitted directly to the system 206 through a communication channel between the image capturing device 202 and the system 206. According to certain embodiments, the communication channel between the image capturing device 202 and the system 206 may be a wired communication channel. In other embodiments, the communication channel may be a wireless communication channel. Examples of wireless communication channels include, but are not limited to, Wi-Fi, Zigbee, IrDA, Bluetooth®, and the like. The image capturing device 202 and the system 206 may also be coupled to each other through a remote computing system. The image capturing device 202 may be coupled to the remote computing system through wired or wireless networks. The system 206 and the remote computing system may further be coupled to each other through wired or wireless channels.

The system 206 further includes an image processing unit 210. The image processing unit 210 is programmed to determine coordinates of each of the illumination sources 204 from the first set of images. The image processing unit 210 receives the first set of images from the receiving unit 208 and processes the images to determine location of each of the illumination sources 204 in the first set of images. The image processing unit 210 may utilize many known methods to determine the coordinates of the illumination sources 204 in the first set of images. For example, the image processing unit 210 may be configured to compare pixel intensity of different regions of each of the first set of images. The image processing unit 210 may further be configured to identify those regions in the first set of images as coordinates of the illumination sources 204 that are more intense than adjoining regions. The image processing unit 210 may identify coordinates for each of the illumination sources 204 in different images from the first set of images.

The system 206 further includes a mapping unit 212 that is programmed to associate an identification parameter for each illumination source 204 with the identified coordinates in the first set of images. The mapping unit 212 is configured to receive identification parameters for each illumination source. The identification parameter for the illumination sources 204 may include, but are not limited to, an IP or IPv6 address or any other network identification parameter, a barcode, a Quick Response (QR) code, or a radio frequency identification parameter (RFID). The mapping unit 212 is configured to store an association of the identification parameters for each illumination source 204 and the pixel coordinates for each illumination source 204.

The system 206 also includes a data repository 214. The data repository 214 is configured to store the association between the pixel-coordinates and the identification parameters for each illumination source 204. Further, the data repository 214 is programmed to store prior characteristic information for each illumination source 204. The image capturing device 202 is utilized to generate a plurality of images of the illumination sources 204 from a plurality of prior perspective angles and distances. Each of these images of the illumination sources 204 taken from prior perspective angles and distances is stored in the data repository 214.

Further, the system 206 includes a control unit 216. The control unit 216 is communicably coupled with the data repository 214 and the image processing unit 210. The image processing unit 210 is configured to identify the pixel coordinates for each illumination source 204 in the plurality of images stored in the data repository 214. Further, the control unit 216 is configured to determine characteristic information for each illumination source 204 from the plurality of images. The color characteristics information determined by the control unit 216 may include, but is not limited to, correlated color temperature (CCT) for each illumination source 204, or a position of the color emitted by each illumination source 204 in a color space (For example: CIE 1931, and CIE 1976). The past characteristic information determined by the control unit 216 for each of the illumination source 204 for the plurality of prior perspective angles and distances is stored in the data repository 214.

Furthermore, the control unit 216 is configured to compute a first distance and a first perspective angle between the image capturing device 202 and the illumination sources 204 at the time of generation of the first set of images. According to certain embodiments, the first distance and first perspective angle may be computed utilizing the geographic location of the image capturing device 202 and the illumination sources 204. Further, according to certain other embodiments, the first distance and the first perspective angle may be fixed by an operator of the system 200.

The control unit 216 is also configured to compute color characteristics information for the illumination sources 204, based on the past color characteristics information stored in the data repository 214. The control unit 216 is configured to fetch past color characteristics information that correspond to the first distance and the first perspective angle between the image capturing device 202 and the illumination sources 204. Specific methods of computation would vary based on the distance of the imaging device 202 from the illumination sources 204.

The control unit 216 is further configured to compare at least the first distance with a predefined distance or the first perspective angle with a predefined perspective angle. In certain embodiments, the control unit 216 may be configured to compare both the first distance and the first perspective angle with respective predefined values. Based on the comparison, the control unit 216 is configured to generate color characteristics for each illumination source 204. The predefined distance and the predefined perspective angle for the illumination sources 204 may be determined after the manufacture of the illumination sources 204. To determine the predefined distances and perspective angles, the prior color characteristics information stored in the data repository 214 is utilized. The predefined distance is that distance in the prior color characteristics information beyond which the color characteristics information matches the manufacturing specifications of each of the illumination sources 204. Similarly, the predefined perspective angle may be identified as the angle between the image capturing device 202 and the illumination sources 204 at which the prior color characteristics information matches the specifications of the illumination sources 204.

When the first distance is less than or equal to the predefined distance, the control unit 216 is configured to determine a first set of unsaturated regions from the first set of images. The control unit 216 identifies the illumination sources 204 in the first set of images through the pixel coordinates determined by the image processing unit 210 and through the plurality of images stored in the data repository 214. Further, the control unit 216 is configured to determine the unsaturated parts in the first set of images. Saturated regions of the images are identified by the control unit 216 by comparing an intensity value of each pixel with a maximum intensity value that can be captured by the image capturing device 202. The pixels with values approximately equal to the maximum intensity value are identified as saturated regions. The remaining pixels are identified as the unsaturated regions in the first set of images. The control unit 216 further determines a first set of color characteristics information for each illumination source 204 from the first set of unsaturated regions. Furthermore, the control unit 216 determines intermediate color characteristics information for each illumination source 204 by computing at least one of an average or a weighted average of the first set of color characteristics information of each illumination source 204. The control unit 216 may also be programmed to compare the first perspective angle with the predefined perspective angle. Based on the comparison between the perspective angles, a correction function may be applied to the intermediate color characteristics information to generate the color characteristics information for each illumination source 204.

When the first distance is greater than the predefined distance, the control unit 216 is configured to determine a set of unsaturated regions from the first set of images. The control unit 216 further determines a first set of color characteristics information for each illumination source 204 from the set of unsaturated regions. Furthermore, the control unit 216 determines the color characteristics information for each illumination source 204 by computing an average of the first set of color characteristics information of each illumination source 204. The control unit 216 may also be programmed to compare the first perspective angle with the predefined perspective angle. Based on the comparison between the perspective angles, a correction function may be applied to the intermediate color characteristics information to generate the color characteristics information for each illumination source 204.

According to certain other embodiments, the image capturing device 202 may be configured to take images from different prior distances and perspective angles such that a difference between color characteristics determined from each of the prior images is not more than a predefined threshold. The predefined threshold may be the maximum tolerance expected in comparison of the first characteristic information and the predefined color characteristics threshold. Based on a comparison between the first distance and the first perspective angle with the prior distances and the prior perspective angles, the first color characteristics information may be determined.

The system 206 further includes a command generation unit 218. The command generation unit 218 is configured to compare the color characteristics information for each illumination source 204 that is determined by the control unit 216 with the predefined characteristic threshold. Further, based on the comparison, the command generation unit 218 may generate commands to control input provided to the illumination sources 204 such that the color characteristics information for each illumination source 204 approaches the predefined characteristic threshold. For example, if the difference between the determined CCT value of an illumination source from the illumination sources 204 and the prescribed CCT threshold is more than 100K, the command generation unit 218 may be configured to generate control signals to vary the power supply to that particular illumination source such that the CCT value gradually approaches the predefined CCT threshold. The command generation unit 218 utilizes the mapping data generated by the mapping unit 212 available with the data repository 214 to deliver appropriate control signals to the right illumination source. The illumination sources 204, as described along with FIG. 1, may be coupled to electronic circuitry. The electronic circuitry is configured to receive control signals from command generation unit 218 and provide power supply to the illumination sources 204 accordingly.

In another embodiment, the command generation unit 218 may be configured to generate alert signals that indicate a difference between the color characteristics information for each illumination source 204 and the predefined characteristic threshold. The alert signals may be displayed as visual alerts on a user interface 220. For example, if CCT is the characteristic information being measured and the difference between CCT value for a particular illumination source 204 and the prescribed CCT threshold is more than 100K, an amber colored indicator may be displayed on the user interface 220. The alert signals generated by the command generation unit 218 may also be communicated to the operator through communication channels such as instant messaging services, electronic mailing services, and the like.

According to certain embodiments, the image capturing device 202 may be calibrated before being utilized to capture images of the illumination sources 204. In the calibration process, the image capturing device 202 may be utilized to capture images of a reference object with known color characteristics. The images of the reference object may then be utilized to generate computed color characteristics for the reference object. Based on the computed color characteristics the image capturing device 202 may be calibrated to produce images that have computed color characteristics equal to the known color characteristics. The known color characteristics of the reference object may further be stored in the data repository 214.

According to certain other embodiments, the system 206 may also include a calibration unit 222. The calibration unit 222 is utilized to calibrate the image capturing device 202 with the aid of reference objects that have known color characteristics. The image capturing device 202 is provided with reference objects and images are generated of these reference objects. The calibration unit 222 compares the color characteristics determined from these images with the known color characteristics of the reference objects. The calibration unit 222 is further configured to provide correction signals to the image capturing device 202 if the color characteristics determined from the images is different from the known color characteristics. In certain embodiments, the image capturing device utilized to generate the plurality of images stored in the data repository 214 may be different from the image capturing device 202 used to generate the first set of images. In such embodiments, the calibration unit 222 may be utilized to calibrate the image capturing device 202 to match the settings of the image capturing device utilized to generate the plurality of images.

Figure 3:
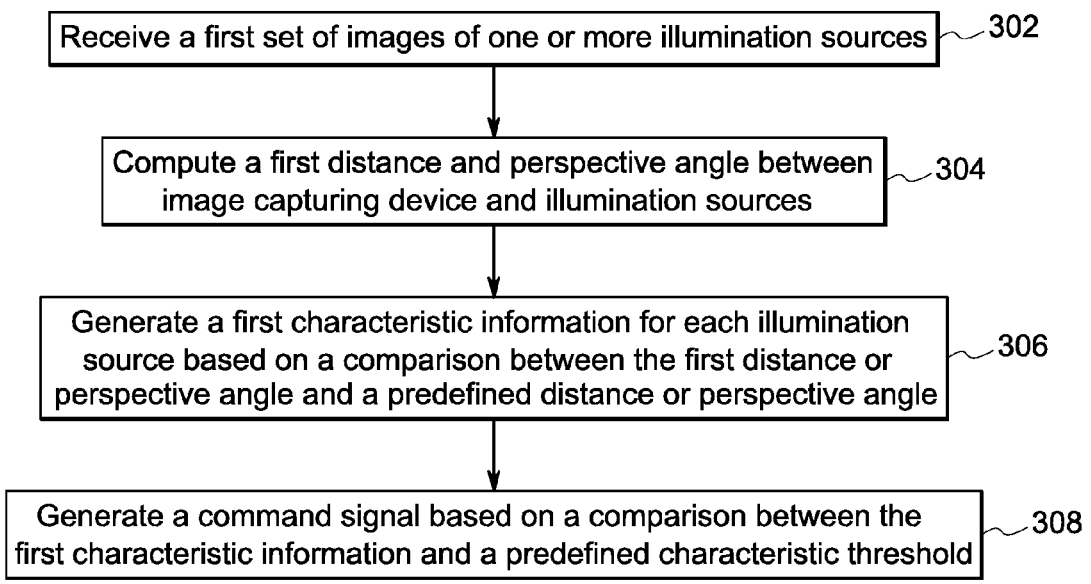
FIG. 3 illustrates a method for determination of color characteristics of the plurality of illumination sources.

FIG. 3 illustrates a flow diagram of the method of determining color characteristics of one or more illumination sources. At step 302, a first set of images of the one or more illumination sources is received. The first of images is generated by an image capturing device, such as the image capturing device 202. At 304, a first distance and a first perspective angle between the image capturing device and the illumination sources during the generation of the first set of images is determined. At 306, a first color characteristics information for each illumination source is determined. The first color characteristics information is determined based on a comparison between at least one of the first distance or the first perspective angle and at least one of a predefined distance or a predefined perspective angle. At step 308, command signals are generated based on a comparison between the first color characteristics information and a predefined color characteristics threshold for each illumination source. The color characteristics that may be determined may include CCT of the illumination source, or a position of a color of the illumination source in a color space.

Prior to determination of color characteristics of the one or more illumination sources, the method includes generating a set of prior images of the one or more illumination sources through the image capturing device. The set of prior images include images captured by the image capturing device from different distances with respect to the illumination sources and may also include images captured from different perspective angles with respect to the illumination sources.

The set of prior images are utilized to generate a set of prior color characteristics information for the one or more illumination sources. In certain embodiments, the prior color characteristics information may be generated by processing the set of prior images. The processing may include converting an image from one format to another format from which position of the colors in a color space can be determined. The position of the colors in the color space can be used to determine a plurality of related color characteristics. For example, CCT value of the one or more illumination sources can be determined using position of the color of the illumination sources in the color space (such as CIE 1931, or CIE 1976). The position may be expressed in terms of "x", "y", and "z" coordinates. The x and y coordinates of the color of the illumination sources may be used in known computational formulae, such as the McCamy's Formula, to determine CCT value of the illumination sources. The method for determination includes determining the predefined distance and the predefined perspective angle from the set of prior color characteristics information, and comparing the prior color characteristics information for each prior distance and prior perspective angle with the predefined color characteristics threshold.

Once the first set of images is received, the first distance and the predefined distance are compared. If the first distance is less than or equal to the predefined distance, a set of unsaturated regions is identified from the first set of images. The unsaturated regions may be identified with the help of a comparison between the set of prior images and the first set of images. A first set of color characteristics information for each illumination source is determined from the set of unsaturated regions. Statistical operations, such as averaging and/or weighted averaging, are performed on the first set of color characteristics information to determine intermediate color characteristics information for each source. Correcting functions, which may be indicative of a difference between the first perspective angle and the predefined perspective angle, may be applied to the intermediate color characteristics information to generate the first color characteristics information for each illumination source.

In another embodiment, when the first distance is greater than the predefined distance, the first set of color characteristics information is generated from the unsaturated regions in the first of images. First color characteristics information for each illumination source is generated by performing statistical operations, such as averaging of values, on the first set of color characteristics information.

The method, according to certain embodiments, also includes steps of generating command signals based on a comparison between the first color characteristics information and the predefined color characteristics threshold. The command signals may include a voltage control signal to control an input provided to the illumination sources such that the first color characteristics information approaches the color characteristics threshold. The command signal may also include alert signals that are configured to provide an indication to an operator about a control action that may be required to optimize the illumination sources performance. The command signals are communicated to the illumination sources based on a mapping between the coordinates of the illumination sources in the first set of images and identification parameters associated with each illumination source.

The method and system for determination of color characteristics of illumination sources in the foregoing paragraphs allows for such determination with the help of images generated through existing hardware. Further, the method takes into account variation in determination caused by changes in the position of the image capturing device with respect to the illumination sources. Further, depending on the image capturing device used a large number of illumination sources may be checked for aging effects thus reducing the cost and time needed to monitor illumination sources individually.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose several embodiments of the invention, including the best mode, and also to enable any person of ordinary skill in the art to practice the embodiments of invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system for determination of color characteristics of illumination sources, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A method, comprising:
    receiving a first set of images of one or more illumination sources, wherein the first set of images are generated by an image capturing device;
    computing a first distance and a first perspective angle between the image capturing device and each of the one or more illumination sources during the generation of the first set of images;
    generating a first characteristic information for each illumination source based on a comparison between at least one of the first distance or the first perspective angle for each illumination source with at least one of a predefined distance or a predefined perspective angle for each illumination source; and
    generating a command signal based on a comparison between the first characteristic information and a predefined characteristic threshold for each of the one or more illumination sources.

2. The method of claim 1, wherein determining the first characteristic information comprises determining at least one of a Correlated Color Temperature (CCT), or a position of a color of the illumination source in a color space.

3. The method of claim 2, further comprising generating a set of prior characteristic information for the one or more illumination sources based on a set of prior images of the illumination sources captured from a set of prior distances and prior perspective angles.

4. The method of claim 3, further comprising computing the predefined distance from the set of prior characteristic information based on a comparison between the set of prior characteristic information with the predefined characteristic threshold for each illumination source.

5. The method of claim 3, further comprising identifying a first set of unsaturated regions in the first set of images based on a comparison between the first set of images and the set of prior images.

6. The method of claim 5, further comprising determining the CCT value of each illumination source based on an average of a color value corresponding to each illumination source pixel coordinate in the first set of unsaturated regions.

7. The method of claim 6, further comprising applying a perspective angle based correction function to the CCT value when the first distance is greater than the predefined distance.

8. The method of claim 1, further comprising identifying pixel coordinates of each illumination source in the received first set of images.

9. The method of claim 8, further comprising mapping the pixel coordinates of each illumination source with a respective identification parameter of each of the illumination sources.

10. The method of claim 1, further comprising generating at least one voltage control signal based on the command signal to adjust the first characteristic information of each illumination source to be equal to the respective predefined characteristic threshold.

11. A system, comprising:
    a receiving unit programmed to receive a first set of images of one or more of illumination sources generated by an image capturing device;
    an image processing unit programmed to determine coordinates of each of the one or more illumination sources in the received images;
    a mapping unit programmed to map the coordinates of each of the illumination sources with a respective identification parameter of the illumination sources;
    a data repository programmed to store prior characteristic information of each of the one or more illumination sources, the prior characteristic information comprising characteristic information determined based on images of the illumination sources captured by the image capturing device from a plurality of prior perspective angles and distances;
    a control unit programmed to:
        identify, from the prior characteristic information, at least one of a predefined distance and a predefined perspective angle, wherein the characteristic information of each of the illumination sources for the predefined distance or the predefined perspective angle is equal to a predefined characteristic threshold for each of the illumination sources;
        compute a first distance and a first perspective angle between the image capturing device and each of the one or more illumination sources during the generation of the first set of images; and
        generate a first characteristic information for each illumination source based on a comparison between at least one of the first distance and the first perspective angle for each illumination source with at least one of the predefined distance and the predefined perspective angle.

12. The system of claim 11, wherein the image capturing device and the receiving unit are communicably coupled to each other.

13. The system of claim 11, further comprising a calibration unit programmed to calibrate the image capturing device with respect to a reference object with known characteristic information.

14. The system of claim 11, wherein the characteristic information comprises at least one of a Correlated Color Temperature (CCT), or a position of a color of the illumination source in a color space.

15. The system of claim 11 further comprises a command generation unit coupled to the control unit, wherein the command generation unit is programmed to generate a command signal based on a comparison between the first characteristic information and the predefined characteristic threshold.

16. The system of claim 15, wherein the command signal comprises at least one voltage control signal to reduce a difference between the first characteristic information and the predefined characteristic threshold.

17. The system of claim 15, wherein the command signal comprises at least one alert signal indicative of the difference between the first characteristic information and the predefined characteristic threshold.

18. The system of claim 17, further comprising a user interface configured to display color-coded indicators proportional to the alert signal.

19. The system of claim 11, wherein when the first distance is less than or equal to the predefined distance the control unit is programmed to:
- identify, from the coordinates of the one or more illumination sources, a first set of unsaturated regions in the first set of images;
- determine a first set of characteristic information for each illumination source in each of the first set of unsaturated regions;
- determine an intermediate characteristic information for each illumination source by computing at least one of an average or a weighted average of the first set of characteristic information; and
- apply a correction function to the intermediate characteristic information to compute the first characteristic information of each illumination source, wherein the correction function is proportional to a difference between the predefined perspective angle and the first perspective angle.

20. The system of claim 11, wherein when the first distance is greater than the predefined distance the control unit is programmed to:
- identify, from the coordinates of the one or more illumination sources, a first set of unsaturated regions in the first set of images;
- determine a first set of characteristic information for each illumination source in each of the first set of unsaturated regions; and
- determine the first characteristic information for each illumination source by computing an average of the first set of characteristic information.

* * * * *